United States Patent
Ji et al.

(10) Patent No.: US 9,546,712 B2
(45) Date of Patent: Jan. 17, 2017

(54) PLANETARY GEAR TRAIN OF AUTOMATIC TRANSMISSION FOR A VEHICLE

(71) Applicant: Hyundai Motor Company, Seoul (KR)

(72) Inventors: Seongwook Ji, Ansan-si (KR); Jae Chang Kook, Hwaseong-si (KR); Wonmin Cho, Hwaseong-si (KR); Myeong Hoon Noh, Seongnam-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/887,044

(22) Filed: Oct. 19, 2015

(65) Prior Publication Data

US 2016/0333972 A1 Nov. 17, 2016

(30) Foreign Application Priority Data

May 13, 2015 (KR) .......................... 10-2015-0066906

(51) Int. Cl.
*F16H 3/66* (2006.01)

(52) U.S. Cl.
CPC ......... *F16H 3/66* (2013.01); *F16H 2200/0073* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | | |
|---|---|---|---|---|
| 8,591,376 B1 * | 11/2013 | Shim | ......................... | F16H 3/66 475/276 |
| 2007/0225108 A1 * | 9/2007 | Kamm | ...................... | F16H 3/66 475/275 |
| 2009/0247351 A1 * | 10/2009 | Seo | ......................... | F16H 3/666 475/275 |
| 2013/0109527 A1 * | 5/2013 | Mellet | ...................... | F16H 3/62 475/275 |

FOREIGN PATENT DOCUMENTS

KR 10-1427977 B1 8/2014

* cited by examiner

*Primary Examiner* — Justin Holmes
(74) *Attorney, Agent, or Firm* — Morgan, Lewis & Bockius LLP

(57) ABSTRACT

A planetary gear train of an automatic transmission for a vehicle may include an input shaft receiving rotary power of an engine, an output shaft outputting the rotary power with rotary speed changed, a first planetary gear set, a second planetary gear set, a third planetary gear set, a fourth planetary gear set, a first rotating shaft operating continuously as an input element by being directly connected with the input shaft, a second rotating shaft selectively connected with a transmission housing, a third rotating shaft, a fourth rotating shaft selectively connected with the transmission housing, a fifth rotating shaft selectively connected with the second rotating shaft, a sixth rotating shaft operating continuously as an output element by being directly connected with the output shaft, a seventh rotating shaft, an eighth rotating shaft selectively connected with the first, the fourth, and the seventh rotating shafts, and six friction elements.

11 Claims, 2 Drawing Sheets

FIG. 2

|      | C1 | C2 | C3 | C4 | B1 | B2 |
|------|----|----|----|----|----|----|
| 1ST  | ●  |    |    |    | ●  | ●  |
| 2ND  | ●  |    |    | ●  |    | ●  |
| 3RD  | ●  |    |    | ●  | ●  |    |
| 4TH  |    |    |    | ●  | ●  | ●  |
| 5TH  |    | ●  |    | ●  | ●  |    |
| 6TH  |    | ●  |    | ●  |    | ●  |
| 7TH  |    |    | ●  | ●  |    | ●  |
| 8TH  |    | ●  | ●  |    |    | ●  |
| 9TH  |    | ●  | ●  |    | ●  |    |
| 10TH |    |    | ●  |    | ●  | ●  |
| 11TH | ●  |    | ●  |    | ●  |    |
| REV  | ●  | ●  |    |    |    | ●  |

PLANETARY GEAR TRAIN OF AUTOMATIC TRANSMISSION FOR A VEHICLE

CROSS-REFERENCE TO RELATED APPLICATION

The present application claims priority to Korean Patent Application Number 10-2015-0066906 filed May 13, 2015, the entire contents of which is incorporated herein for all purposes by this reference.

BACKGROUND OF THE INVENTION

1. Field of the Invention

The present invention relates to an automatic transmission for a vehicle, and more particularly, to a planetary gear train of an automatic transmission for a vehicle which implements forward 11-speeds by a minimum configuration to improve power transmission performance and fuel efficiency.

2. Description of the Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of transmission speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8 and 9-speed automated transmissions tend to be implemented and the research and development of a planetary gear train capable of implementing more transmission stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that implements forward 11-speed and reverse 1-speed transmission stages with a minimum configuration and improves power transmission efficiency and fuel efficiency through multiple speed stages and quietness of driving by using operation point in a range of low rotation speed of an engine.

According to various aspects of the present invention, a planetary gear train of an automatic transmission for a vehicle may include an input shaft receiving rotary power of an engine, an output shaft outputting the rotary power with rotary speed changed, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotating shaft including the first sun gear and the third sun gear and operating continuously as an input element by being directly connected with the input shaft, a second rotating shaft including the first planetary carrier and selectively connected with a transmission housing, a third rotating shaft including the first ring gear and the second planetary carrier, a fourth rotating shaft including the second sun gear and selectively connected with the transmission housing, a fifth rotating shaft including the second ring gear and the fourth sun gear and selectively connected with the second rotating shaft, a sixth rotating shaft including the third planetary carrier and the fourth ring gear and operating continuously as an output element by being directly connected with the output shaft, a seventh rotating shaft including the third ring gear, an eighth rotating shaft including the fourth planetary carrier and selectively connected with the first, the fourth, and the seventh rotating shafts, and six friction elements disposed at portions selectively connecting the rotating shafts or selectively connecting the rotating shafts and the transmission housing respectively.

Each of the first, the second, the third, and the fourth planetary gear sets may include a single-pinion planetary gear set.

The four planetary gear sets may be disposed in an order of the fourth, the second, the first, and the third planetary gear set starting from an engine side.

The six friction elements may include a first clutch interposed between the fourth rotating shaft and the eighth rotating shaft, a second clutch interposed between the second rotating shaft and the fifth rotating shaft, a third clutch interposed between the first rotating shaft and the eighth rotating shaft, a fourth clutch interposed between the seventh rotating shaft and the eighth rotating shaft, a first brake interposed between the second rotating shaft and the transmission housing, and a second brake interposed between the fourth rotating shaft and the transmission housing.

Transmission stages implemented by selectively operating the six friction elements may include a first forward transmission stage implemented by simultaneously operating the first clutch and the first and the second brakes; a second forward transmission stage implemented by simultaneously operating the first and the fourth clutches and the second brake, a third forward transmission stage implemented by simultaneously operating the first and the fourth clutches and the first brake, a fourth forward transmission stage implemented by simultaneously operating the fourth clutch and the first and the second brakes, a fifth forward transmission stage implemented by simultaneously operating the second and the fourth clutches and the first brake, a sixth forward transmission stage implemented by simultaneously operating the second and the fourth clutches and the second brake, a seventh forward transmission stage implemented by simultaneously operating the third and the fourth clutches and the second brake, an eighth forward transmission stage implemented by simultaneously operating the second and the third clutches and the second brake, a ninth forward transmission stage implemented by simultaneously operating the second and the third clutches and the first brake, a tenth forward transmission stage implemented by simultaneously operating the third clutch and the first and the second brakes, an eleventh forward transmission stage implemented by simultaneously operating the first and the third clutches and the first brake, and a reverse transmission stage implemented by simultaneously operating the first and the second clutches and the second brake.

According to various aspects of the present invention, a planetary gear train of an automatic transmission for a vehicle may include an input shaft receiving rotary power of an engine, an output shaft outputting the rotary power with rotary speed changed, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first clutch selectively connecting the second sun gear with the fourth planetary carrier, a second clutch selectively connecting the first planetary carrier with the second ring gear, a third clutch selectively connecting the first sun gear and the third sun gear with the fourth planetary carrier, a fourth clutch selectively connecting the third ring gear with the fourth planetary carrier, a first brake selectively connecting the first planetary carrier with a transmission housing, and a second brake selectively connecting the second sun gear with the transmission housing, in which the input shaft may be directly connected with the first sun gear, the output shaft may be directly connected with the third planetary carrier, the first sun gear and the third sun gear may be directly connected, the first ring gear and the second planetary carrier may be directly connected, the second ring gear and the fourth sun gear may be directly connected, and the third planetary carrier and the fourth ring gear may be directly connected.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective friction elements applied to an exemplary planetary gear train according to the present invention.

Figure 1:
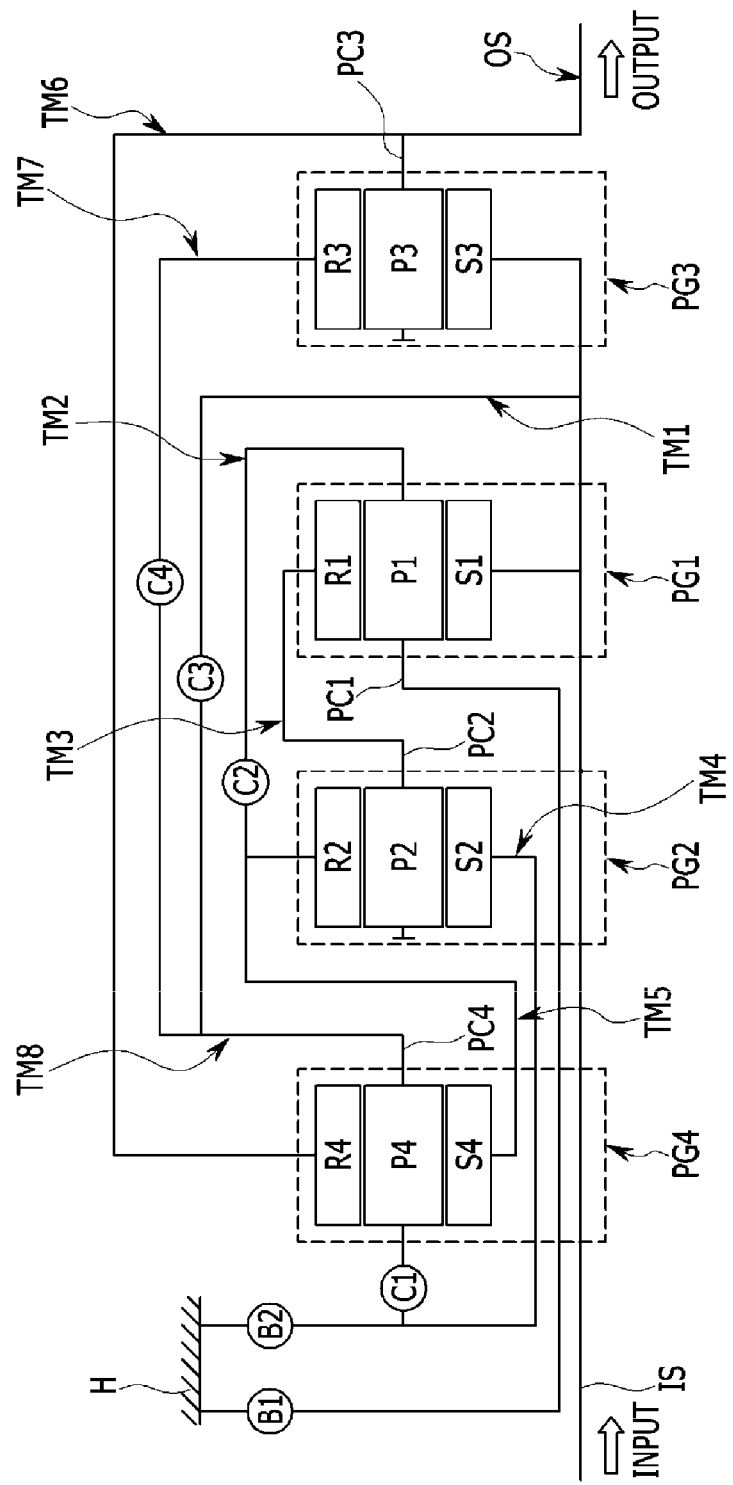
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of an exemplary planetary gear train according to the present invention.

Referring to FIG. 1, the planetary gear train according to various embodiments of the present invention includes a first, a second, a third, and a fourth planetary gear set PG1, PG2, PG3, and PG4 disposed on a same axis line, an input shaft IS, an output shaft OS, eight rotating shafts TM1 to TM8 that connect respective rotating elements of the first, second, third, and fourth planetary gear sets PG1, PG2, PG3, and PG4 to each other, six friction elements C1 to C4 and B1 and B2, and a transmission housing H.

As a result, rotary power input from the input shaft IS is transmitted by an inter-complementation operation of the first, second, third, and fourth planetary gear sets PG1, PG2, PG3, and PG4 to be output through the output shaft OS with rotary speed changed.

In addition, the respective simple planetary gear sets are disposed in an order of the fourth, the second, the first, and the third planetary gear sets PG4, PG2, PG1, and PG3 starting from an engine side.

The input shaft IS is an input member and rotary power from a crankshaft of an engine is torque-converted through a torque converter to be input into the input shaft IS.

The output shaft OS as an output member transmits transmitted driving power to a driving shaft through a differential.

The first planetary gear set PG1, which is a single-pinion planetary gear set, includes a first sun gear S1, a first planetary carrier PC1 that rotatably supports a first pinion P1 which engages externally with the first sun gear S1, and a first ring gear R1 which engages internally with the first pinion P1 as rotating elements.

The second planetary gear set PG2, which is a single-pinion planetary gear set, includes a second sun gear S2, a second planetary carrier PC2 that rotatably supports a second pinion P2 which engages externally with the second sun gear S2, and a second ring gear R2 which engages internally with the second pinion P2.

The third planetary gear set PG3, which is a single-pinion planetary gear set, includes a third sun gear S3, a third planetary carrier PC3 that rotatably supports a third pinion P3 which engages externally with the third sun gear S3, and a third ring gear R3 which engages internally with the third pinion P3.

The fourth planetary gear set PG4, which is a single-pinion planetary gear set, includes a fourth sun gear S4, a fourth planetary carrier PC4 that rotatably supports a fourth pinion P4 which engages externally with the fourth sun gear S4, and a fourth ring gear R4 which engages internally with the fourth pinion P4.

In the first, second, third, and fourth planetary gear sets PG1, PG2, PG3, and PG4, one or more rotating elements are directly connected to each other to operate with a total of eight rotating shafts TM1 to TM8.

Configurations of the eight rotating shafts TM1 to TM8 will be described below.

The first rotating shaft TM1 is configured to include the first sun gear S1 and the third sun gear S3 and operates continuously as an input element by being directly connected with the input shaft IS.

The second rotating shaft TM2 is configured to include the first planetary carrier PC1 and is selectively connected with a transmission housing H.

The third rotating shaft TM3 is configured to include the first ring gear R1 and the second planetary carrier PC2.

The fourth rotating shaft TM4 is configured to include the second sun gear S2 and is selectively connected with the transmission housing H.

The fifth rotating shaft TM5 is configured to include the second ring gear R2 and the fourth sun gear S4 and is selectively connected with the second rotating shaft TM2.

The sixth rotating shaft TM6 is configured to include the third planetary carrier PC3 and the fourth ring gear R4 and operates continuously as an output element by being directly connected with the output shaft OS.

The seventh rotating shaft TM7 is configured to include the third ring gear R3.

The eighth rotating shaft TM8 is configured to include the fourth planetary carrier PC4 and is selectively connected with the first, the fourth, the seventh rotating shaft TM1, TM4, and TM7.

In addition, four clutches C1, C2, C3, and C4 which are friction elements are disposed at portions selectively connecting the rotating shafts respectively, among the rotating shafts TM1 to TM8.

Further, two brakes B1 and B2 which are other friction elements are disposed at portions selectively connecting the transmission housing H and the rotating shafts respectively, among the rotating shafts TM1 to TM8.

Layout positions of the six friction elements C1 to C4 and B1 to B2 will be described below.

The first clutch C1 is interposed between the fourth rotating shaft TM4 and the eighth rotating shaft TM8 and operates such that the fourth rotating shaft TM4 and the eighth rotating shaft TM8 selectively operate as one body.

The second clutch C2 is interposed between the second rotating shaft TM2 and the fifth rotating shaft TM5 and operates such that the second rotating shaft TM2 and the fifth rotating shaft TM5 selectively operate as one body.

The third clutch C3 is interposed between the first rotating shaft TM1 and the eighth rotating shaft TM8 and operates such that the first rotating shaft TM1 and the eighth rotating shaft TM8 selectively operate as one body.

The fourth clutch C4 is interposed between the seventh rotating shaft TM7 and the eighth rotating shaft TM8 and operates such that the seventh rotating shaft TM7 and the eighth rotating shaft TM8 selectively operate as one body.

The first brake B1 is interposed between the second rotating shaft TM2 and the transmission housing H and operates such that the second rotating shaft TM2 can selectively operate as a fixing element.

The second brake B2 is interposed between the fourth rotating shaft TM4 and the transmission housing H and operates such that the fourth rotating shaft TM4 can selectively operate as a fixing element.

The respective friction elements constituted by the first, the second, the third, and the fourth clutch C1, C2, C3, and C4 and the first and the second brake B1 and B2 as described above may be configured by multiple-disk hydraulic friction joining units which are friction-joined by hydraulic pressure.

FIG. 2 is an operation table for each of transmission steps of respective friction elements applied to an exemplary planetary gear train according to the present invention.

As illustrated in FIG. 2, in an exemplary planetary gear train according to the present invention, while three friction elements operate in the respective transmission steps, a transmission is performed.

A first forward transmission step 1ST is implemented by simultaneously operating the first clutch C1 and the first and the second brake B1 and B2.

A second forward transmission step 2ND is implemented by simultaneously operating the first and the fourth clutch C1 and C4 and the second brake B2.

A third forward transmission step 3RD is implemented by simultaneously operating the first and the fourth clutch C1 and C4 and the first brake B1.

A fourth forward transmission step 4TH is implemented by simultaneously operating the fourth clutch C4 and the first and the second brake B1 and B2.

A fifth forward transmission step 5TH is implemented by simultaneously operating the second and the fourth clutch C2 and C4 and the first brake B1.

A sixth forward transmission step 6TH is implemented by simultaneously operating the second and the fourth clutch C2 and C4 and the second brake B2.

A seventh forward transmission step 7TH is implemented by simultaneously operating the third and the fourth clutch C3 and C4 and the second brake B2.

An eighth forward transmission step 8TH is implemented by simultaneously operating the second and the third clutch C2 and C3 and the second brake B2.

A ninth forward transmission step 9TH is implemented by simultaneously operating the second and the third clutch C2 and C3 and the first brake B1.

A tenth forward transmission step 10TH is implemented by simultaneously operating the third clutch C3 and the first and the second brake B1 and B2.

An eleventh forward transmission step 11TH is implemented by simultaneously operating the first and the third clutch C1 and C3 and the first brake B1.

A reverse transmission step REV is implemented by simultaneously operating the first and the second clutch C1 and C2 and the second brake B2.

The above transmission processes will be described more in detail below.

In the first forward transmission step 1ST, when the first clutch C1 and the first and the second brake B1 and B2 simultaneously operate, an input is made into the first rotating shaft TM1 in a state of the fourth rotating shaft TM4 being connected with the eighth rotating shaft TM8 and the first forward transmission step 1ST is performed while the second, fourth, and eighth rotating shafts TM2, TM4, and TM8 operate as fixing elements.

In the second forward transmission step 2ND, when the first and the fourth clutch C1 and C4 and the second brake B2 simultaneously operate, an input is made into the first rotating shaft TM1 in a state of the fourth rotating shaft TM4 being connected with the eighth rotating shaft TM8 and the seventh rotating shaft TM7 being connected with the eighth rotating shaft TM8 and the second forward transmission step 2ND is performed while the fourth, eighth, and seventh rotating shafts TM4, TM8, and TM7 operate as fixing elements.

In the third forward transmission step 3RD, when the first and the fourth clutch C1 and C4 and the first brake B1 simultaneously operate, an input is made into the first rotating shaft TM1 in a state of the fourth rotating shaft TM4 being connected with the eighth rotating shaft TM8 and the seventh rotating shaft TM7 being connected with the eighth rotating shaft TM8 and the third forward transmission step 3RD is performed while the second rotating shaft TM2 operates as a fixing element.

In the fourth forward transmission step 4TH, when the fourth clutch C4 and the first and the second brake B1 and B2 simultaneously operate, an input is made into the first rotating shaft TM1 in a state of the seventh rotating shaft TM7 being connected with the eighth rotating shaft TM8 and the fourth forward transmission step 4TH is performed while the second and the fourth rotating shaft TM2 and TM4 operate as fixing elements.

In the fifth forward transmission step 5TH, when the second and the fourth clutch C2 and C4 and the first brake B1 simultaneously operate, an input is made into the first rotating shaft TM1 in a state of the second rotating shaft TM2 being connected with the fifth rotating shaft TM5 and the seventh rotating shaft TM7 being connected with the eighth rotating shaft TM8 and the fifth forward transmission step 5TH is performed while the second and the fifth rotating shaft TM2 and TM5 operate as fixing elements.

In the sixth forward transmission step 6TH, when the second and the fourth clutch C2 and C4 and the second brake B2 simultaneously operate, an input is made into the first rotating shaft TM1 in a state of the second rotating shaft TM2 being connected with the fifth rotating shaft TM5 and the seventh rotating shaft TM7 being connected with the eighth rotating shaft TM8 and the sixth forward transmission step 6TH is performed while the fourth rotating shaft TM4 operates as a fixing element.

In the seventh forward transmission step 7TH, when the third and the fourth clutch C3 and C4 and the second brake B2 simultaneously operate, an input is made into the first rotating shaft TM1 in a state of the eighth rotating shaft TM8 being connected with the first and the seventh rotating shaft TM1 and TM7 and the seventh forward transmission step 7TH in which rotary power of the input shaft IS is intactly outputted, is performed while the fourth rotating shaft TM4 operates as a fixing element.

In the eighth forward transmission step 8TH, when the second and the third clutch C2 and C3 and the second brake B2 simultaneously operate, an input is made into the first rotating shaft TM1 in a state of the second rotating shaft TM2 being connected with the fifth rotating shaft TM5 and the first rotating shaft TM1 being connected with the eighth rotating shaft TM8, the eighth forward transmission step 8TH is performed while the fourth rotating shaft TM4 operates as a fixing element.

In the ninth forward transmission step 9TH, when the second and the third clutch C2 and C3 and the first brake B1 simultaneously operate, an input is made into the first rotating shaft TM1 in a state of the second rotating shaft TM2 being connected with the fifth rotating shaft TM5 and the first rotating shaft TM1 being connected with the eighth rotating shaft TM8 and the ninth forward transmission step 9TH is performed while the second and the fifth rotating shaft TM2 and TM5 operate as fixing elements.

In the tenth forward transmission step 10TH, when the third clutch C3 and the first and the second brake B1 and B2 simultaneously operate, an input is made into the first rotating shaft TM1 in a state of the first rotating shaft TM1 being connected with the eighth rotating shaft TM8 and the tenth forward transmission step 10TH is performed while the second and the fourth rotating shaft TM2 and TM4 operate as fixing elements.

In the eleventh forward transmission step 11TH, when the first and the third clutch C1 and C3 and the first brake B1 simultaneously operate, an input is made into the first rotating shaft TM1 in a state of the fourth rotating shaft TM4 being connected with the eighth rotating shaft TM8 and the first rotating shaft TM1 being connected with the eighth rotating shaft TM8 and the eleventh forward transmission step 11TH is performed while the second rotating shaft TM2 operates as a fixing element.

In the reverse transmission step REV, when the first and the second clutch C1 and C2 and the second brake B2 simultaneously operate, an input is made into the first rotating shaft TM1 in a state of the fourth rotating shaft TM4 being connected with the eighth rotating shaft TM8 and the second rotating shaft TM2 being connected with the fifth rotating shaft TM5 and the reverse transmission step REV is performed while the fourth and the eighth rotating shaft TM4 and TM8 operate as fixing elements.

As described above, in the planetary gear train according to various embodiments of the present invention, four planetary gear sets PG1, PG2, PG3, and PG4 may implement the forward 11-speed and reverse 1-speed transmission steps through the operation-control of four clutches C1, C2, C3, and C4 and two brakes B1 and B2.

As a result, the planetary gear train according to various embodiments of the present invention may improve the power transmission efficiency and the fuel efficiency through the multiple speed stages of the automatic transmission.

Further, quietness of driving can be also much improved because transmission steps suitable for rotation speed of an engine can be implemented through the multiple speed stages of the automatic transmission.

In addition, three friction elements operate for each transmission step, and as a result, a friction drag loss is decreased by minimizing the number of friction elements which do not operate, thereby improving the power transmission efficiency and the fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A planetary gear train of an automatic transmission for a vehicle comprising:
an input shaft receiving rotary power of an engine;
an output shaft outputting the rotary power with rotary speed changed;
a first planetary gear set including a first sun gear, a first planetary carrier, and a first ring gear;

a second planetary gear set including a second sun gear, a second planetary carrier, and a second ring gear;
a third planetary gear set including a third sun gear, a third planetary carrier, and a third ring gear;
a fourth planetary gear set including a fourth sun gear, a fourth planetary carrier, and a fourth ring gear;
a first rotating shaft including the first sun gear and the third sun gear and operating continuously as an input element by being directly connected with the input shaft;
a second rotating shaft including the first planetary carrier and selectively connected with a transmission housing;
a third rotating shaft including the first ring gear and the second planetary carrier;
a fourth rotating shaft including the second sun gear and selectively connected with the transmission housing;
a fifth rotating shaft including the second ring gear and the fourth sun gear and selectively connected with the second rotating shaft;
a sixth rotating shaft including the third planetary carrier and the fourth ring gear and operating continuously as an output element by being directly connected with the output shaft;
a seventh rotating shaft including the third ring gear;
an eighth rotating shaft including the fourth planetary carrier and selectively connected with the first, the fourth, and the seventh rotating shafts; and
six friction elements disposed at portions selectively connecting the rotating shafts or selectively connecting the rotating shafts and the transmission housing respectively.

2. The planetary gear train of claim 1, wherein each of the first, the second, the third, and the fourth planetary gear sets comprises a single-pinion planetary gear set.

3. The planetary gear train of claim 2, wherein the four planetary gear sets are disposed in an order of the fourth, the second, the first, and the third planetary gear set starting from an engine side.

4. The planetary gear train of claim 1, wherein the four planetary gear sets are disposed in an order of the fourth, the second, the first, and the third planetary gear set starting from an engine side.

5. The planetary gear train of claim 1, wherein the six friction elements comprise:
a first clutch interposed between the fourth rotating shaft and the eighth rotating shaft;
a second clutch interposed between the second rotating shaft and the fifth rotating shaft;
a third clutch interposed between the first rotating shaft and the eighth rotating shaft;
a fourth clutch interposed between the seventh rotating shaft and the eighth rotating shaft;
a first brake interposed between the second rotating shaft and the transmission housing; and
a second brake interposed between the fourth rotating shaft and the transmission housing.

6. The planetary gear train of claim 5, wherein transmission stages implemented by selectively operating the six friction elements include:
a first forward transmission stage implemented by simultaneously operating the first clutch and the first and the second brakes;
a second forward transmission stage implemented by simultaneously operating the first and the fourth clutches and the second brake;
a third forward transmission stage implemented by simultaneously operating the first and the fourth clutches and the first brake;
a fourth forward transmission stage implemented by simultaneously operating the fourth clutch and the first and the second brakes;
a fifth forward transmission stage implemented by simultaneously operating the second and the fourth clutches and the first brake;
a sixth forward transmission stage implemented by simultaneously operating the second and the fourth clutches and the second brake;
a seventh forward transmission stage implemented by simultaneously operating the third and the fourth clutches and the second brake;
an eighth forward transmission stage implemented by simultaneously operating the second and the third clutches and the second brake;
a ninth forward transmission stage implemented by simultaneously operating the second and the third clutches and the first brake;
a tenth forward transmission stage implemented by simultaneously operating the third clutch and the first and the second brakes;
an eleventh forward transmission stage implemented by simultaneously operating the first and the third clutches and the first brake; and
a reverse transmission stage implemented by simultaneously operating the first and the second clutches and the second brake.

7. A planetary gear train of an automatic transmission for a vehicle comprising:
an input shaft receiving rotary power of an engine;
an output shaft outputting the rotary power with rotary speed changed;
a first planetary gear set including a first sun gear, a first planetary carrier, and a first ring gear;
a second planetary gear set including a second sun gear, a second planetary carrier, and a second ring gear;
a third planetary gear set including a third sun gear, a third planetary carrier, and a third ring gear;
a fourth planetary gear set including a fourth sun gear, a fourth planetary carrier, and a fourth ring gear;
a first clutch selectively connecting the second sun gear with the fourth planetary carrier;
a second clutch selectively connecting the first planetary carrier with the second ring gear;
a third clutch selectively connecting the first sun gear and the third sun gear with the fourth planetary carrier;
a fourth clutch selectively connecting the third ring gear with the fourth planetary carrier;
a first brake selectively connecting the first planetary carrier with a transmission housing; and
a second brake selectively connecting the second sun gear with the transmission housing,
wherein the input shaft is directly connected with the first sun gear,
the output shaft is directly connected with the third planetary carrier,
the first sun gear and the third sun gear are directly connected,
the first ring gear and the second planetary carrier are directly connected,
the second ring gear and the fourth sun gear are directly connected, and
the third planetary carrier and the fourth ring gear are directly connected.

8. The planetary gear train of claim 7, wherein each of the first, the second, the third, the fourth planetary gear sets comprises a single-pinion planetary gear set.

9. The planetary gear train of claim 8, wherein the planetary gear sets are disposed in an order of the fourth, the second, the first, and the third planetary gear set starting from an engine side.

10. The planetary gear train of claim 7, wherein the planetary gear sets are disposed in an order of the fourth, the second, the first, and the third planetary gear set starting from an engine side.

11. The planetary gear train of claim 7, wherein:
transmission stages implemented by selectively operating the first, the second, the third, and the fourth clutch and the first and the second brake include:
a first forward transmission stage implemented by simultaneously operating the first clutch and the first and the second brakes;
a second forward transmission stage implemented by simultaneously operating the first and the fourth clutches and the second brake;
a third forward transmission stage implemented by simultaneously operating the first and the fourth clutches and the first brake;
a fourth forward transmission stage implemented by simultaneously operating the fourth clutch and the first and the second brakes;
a fifth forward transmission stage implemented by simultaneously operating the second and the fourth clutches and the first brake;
a sixth forward transmission stage implemented by simultaneously operating the second and the fourth clutches and the second brake;
a seventh forward transmission stage implemented by simultaneously operating the third and the fourth clutches and the second brake;
an eighth forward transmission stage implemented by simultaneously operating the second and the third clutches and the second brake;
a ninth forward transmission stage implemented by simultaneously operating the second and the third clutches and the first brake;
a tenth forward transmission stage implemented by simultaneously operating the third clutch and the first and the second brakes;
an eleventh forward transmission stage implemented by simultaneously operating the first and the third clutches and the first brake; and
a reverse transmission stage implemented by simultaneously operating the first and the second clutches and the second brake.

* * * * *